(12) United States Patent
Safai

(10) Patent No.: US 10,908,100 B2
(45) Date of Patent: Feb. 2, 2021

(54) FLEXIBLE APERTURE X-RAY INSPECTION

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 16/140,261

(22) Filed: Sep. 24, 2018

(65) Prior Publication Data

US 2020/0096457 A1 Mar. 26, 2020

(51) Int. Cl.
*G01N 23/203* (2006.01)
*G01N 23/20008* (2018.01)
*G21K 1/06* (2006.01)

(52) U.S. Cl.
CPC ..... *G01N 23/203* (2013.01); *G01N 23/20008* (2013.01); *G21K 1/06* (2013.01); *G01N 2223/053* (2013.01)

(58) Field of Classification Search
None
See application file for complete search history.

(56) References Cited

U.S. PATENT DOCUMENTS

| | | | | |
|---|---|---|---|---|
| 2,814,727 A | * | 11/1957 | Gund | G21K 1/10 250/396 R |
| 4,172,979 A | * | 10/1979 | Morrison | A61N 5/1042 378/148 |
| 7,852,990 B2 | * | 12/2010 | Aulbach | G21K 1/04 378/148 |
| 9,151,721 B2 | | 10/2015 | Safai | |
| 2003/0131581 A1 | * | 7/2003 | Yoo | A44C 5/102 59/80 |
| 2009/0141858 A1 | * | 6/2009 | Aulbach | A61B 6/06 378/21 |
| 2012/0140887 A1 | * | 6/2012 | Mundy | A61N 5/1048 378/65 |

FOREIGN PATENT DOCUMENTS

DE 519955 3/1931

OTHER PUBLICATIONS

Extended European Search Report for European Patent Application No. 19183525.5 dated Jan. 13, 2020.
Examination Report for GCC Patent Application No. GC 2019-38331 dated Oct. 9, 2020.

* cited by examiner

*Primary Examiner* — Hoon K Song
(74) *Attorney, Agent, or Firm* — Kunzler Bean & Adamson

(57) ABSTRACT

Disclosed herein is an apparatus for forming an x-ray beam. The apparatus comprises a plurality of links pivotably coupled together, in an end-to-end manner, to form a continuous loop. The plurality of links comprises two or more links configured to block a transmission of an x-ray emission. The plurality of links also comprises at least one link comprising an aperture that is configured to allow only a portion of the x-ray emission to pass through the aperture.

20 Claims, 5 Drawing Sheets

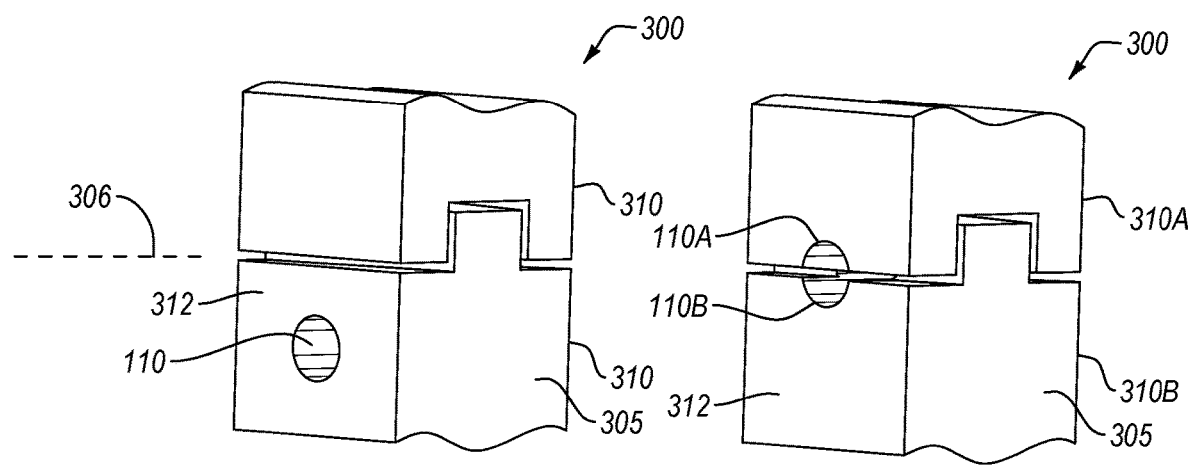
FIG. 6  FIG. 7
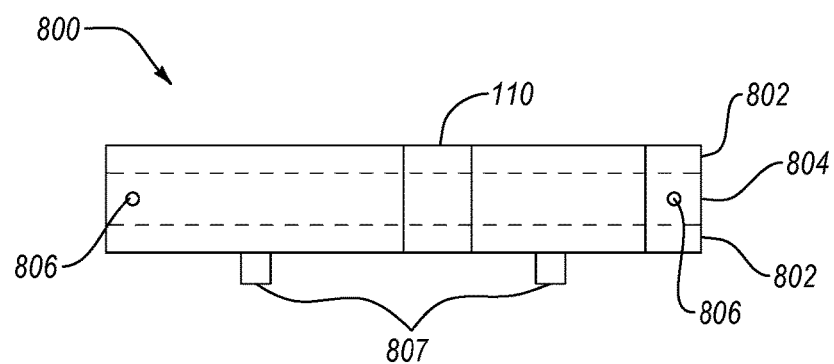
FIG. 8

FLEXIBLE APERTURE X-RAY INSPECTION

FIELD

This disclosure relates generally to the non-destructive inspection of parts, and more particularly to beam forming for inspection of parts using x-ray apparatuses, systems, and methods.

BACKGROUND

Some inspection techniques, such as non-destructive testing, foreign object detection, non-line-of-site examination, etc., are employed when destruction of a part to be inspected is not desirable or practical. Certain x-ray inspection techniques provide a penetrating scan or examination of a part. Such x-ray inspection techniques are used in a variety of applications, such as homeland security, oil and gas mining and refining, pipeline inspection, transportation, automotive, aerospace, marine, mining, shipping, and storage, among others.

Some x-ray inspection techniques utilize the detection of x-rays that pass through a part, from one side of the part to the opposite side of the part. In other inspection techniques, such as x-ray backscattering techniques, the x-rays reflected back from the part (e.g., backscattered x-rays) are detected and then used to produce images or an analysis of the part. The pattern and intensity of the x-rays depends upon the materials and organization of the part. Accordingly, the pattern and intensity of the detected x-rays can be used to generate an image, which is relied upon to determine a quality, characteristic, or anomaly of the part.

Traditionally, an x-ray beam useful for inspection requires using a relatively large and heavy shield sufficient to block unwanted x-rays. The heavy shield includes one or more apertures. The shield is moved (e.g., rotated) to allow some of the x-rays to pass through the aperture, thus generating an x-ray beam shaped by the aperture to inspect a part or other inspection target. Because of the size and weight of the shield, applications are limited and considerable effort is required to transport and position the equipment needed for an x-ray inspection test.

SUMMARY

The subject matter of the present application has been developed in response to the present state of the art, and in particular, in response to the shortcomings of traditional x-ray inspection devices, that have not yet been fully solved by currently available techniques. Accordingly, the subject matter of the present application has been developed to provide an x-ray inspection device, and associated apparatuses, systems, and methods, with a flexible aperture chain, that overcomes at least some of the above-discussed shortcomings of prior art techniques.

Disclosed herein is an apparatus for forming an x-ray beam. The apparatus comprises a plurality of links pivotably coupled together, in an end-to-end manner, to form a continuous loop. The plurality of links comprises two or more links configured to block an e-ray emission. The plurality of links also comprises at least one link comprising an aperture that is configured to allow only a portion of the x-ray emission to pass through the aperture. The preceding subject matter of this paragraph characterizes example 1 of the present disclosure.

An entirety of the aperture is formed in one link. The preceding subject matter of this paragraph characterizes example 2 of the present disclosure, wherein example 2 also includes the subject matter according to example 1, above.

The aperture is formed in two adjacent links. The preceding subject matter of this paragraph characterizes example 3 of the present disclosure, wherein example 3 also includes the subject matter according to any one of examples or 1 or 2, above.

The plurality of links are pivotably coupled together at corresponding pivot axes and the aperture has a central axis that is perpendicular to the pivot axis. The preceding subject matter of this paragraph characterizes example 4 of the present disclosure, wherein example 4 also includes the subject matter according to any one of examples or 1-3, above.

The plurality of links are pivotably coupled together at corresponding pivot axes and the aperture has a central axis that is parallel to the pivot axis. The preceding subject matter of this paragraph characterizes example 5 of the present disclosure, wherein example 5 also includes the subject matter according to any one of examples or 1-4, above.

At least one of the plurality of links comprises interface structures to facilitate interaction between the at least one of the plurality of links and a drive or support feature. The preceding subject matter of this paragraph characterizes example 6 of the present disclosure, wherein example 6 also includes the subject matter according to any one of examples or 1-5, above.

At least one of the plurality of links comprises an x-ray shielding layer. The preceding subject matter of this paragraph characterizes example 7 of the present disclosure, wherein example 7 also includes the subject matter according to any one of examples or 1-6, above.

At least one of the plurality of links comprises a wear layer. The preceding subject matter of this paragraph characterizes example 8 of the present disclosure, wherein example 8 also includes the subject matter according to example 7, above.

The apparatus further comprises a plurality of apertures. At least one of the plurality of apertures is separated from an adjacent aperture of the plurality of apertures by at least two links of the plurality of links. The preceding subject matter of this paragraph characterizes example 9 of the present disclosure, wherein example 9 also includes the subject matter according to any one of examples or 1-8, above.

Further disclosed herein is a system for x-ray backscattering inspection. The system comprises an x-ray emitter comprising an x-ray emission port and configured to generate an x-ray emission that passes through the x-ray emission port. The system also comprises a first flexible chain movably aligned with the x-ray emitter. The first flexible chain comprises a plurality of links pivotably coupled together, in an end-to-end manner, to form a continuous loop. The plurality of links comprises two or more links configured to block the x-ray emission. The plurality of links also comprises at least one link comprising an aperture configured to allow only a portion of the x-ray emission to pass through the aperture. The system additionally comprises a drive system coupled to the x-ray emitter in engagement with the first flexible chain. The drive system is operable to advance the aperture of the first flexible chain along the x-ray emission port. The preceding subject matter of this paragraph characterizes example 10 of the present disclosure.

The system further comprises a second flexible chain. The second flexible chain aligns with the first flexible chain at the x-ray emission port to form a compound aperture. The preceding subject matter of this paragraph characterizes example 11 of the present disclosure, wherein example 11 also includes the subject matter according to example 10, above.

The x-ray emission port is elongated in a lengthwise direction. The drive system advances the first flexible chain along the x-ray emission port in the lengthwise direction. The preceding subject matter of this paragraph characterizes example 12 of the present disclosure, wherein example 12 also includes the subject matter according to any one of examples or 10-11, above.

Additionally disclosed herein is a method of x-ray manipulation for x-ray inspection. The method comprises generating an x-ray emission. And receiving the x-ray emission at a flexible chain. The method further comprises advancing the flexible chain along the x-ray emission to align an aperture of the flexible chain with the x-ray emission. The method additionally comprises passing only a portion of the x-ray emission through the aperture to form an x-ray beam. The method also comprises blocking the x-ray emission not passed through the aperture with the flexible chain. The preceding subject matter of this paragraph characterizes example 13 of the present disclosure.

Advancing the flexible chain comprises driving with the flexible chain in a continuous loop. The preceding subject matter of this paragraph characterizes example 14 of the present disclosure, wherein example 14 also includes the subject matter according to example 13, above.

Advancing the flexible chain further comprises aligning the aperture with an x-ray emission port of an x-ray emitter. The preceding subject matter of this paragraph characterizes example 15 of the present disclosure, wherein example 15 also includes the subject matter according to any one of examples or 13-14, above.

Advancing the flexible chain comprises advancing the aperture through the x-ray emission to raster the portion of the x-ray emission along a scanning path. The preceding subject matter of this paragraph characterizes example 16 of the present disclosure, wherein example 16 also includes the subject matter according to any one of examples or 13-15, above.

Advancing the flexible chain comprises guiding the flexible chain with at least one guide structure. The preceding subject matter of this paragraph characterizes example 17 of the present disclosure, wherein example 17 also includes the subject matter according to any one of examples or 13-16, above.

The method further comprises directing the x-ray beam to an inspection target. The method also comprises detecting a portion of the x-ray beam affected by the inspection target. The method additionally comprises determining a characteristic of the inspection target based on the detected portion of the x-ray beam. The preceding subject matter of this paragraph characterizes example 18 of the present disclosure, wherein example 18 also includes the subject matter according to any one of examples 13-17, above.

The detected portion of the x-ray beam comprises x-ray energy backscattered by the inspection target. The preceding subject matter of this paragraph characterizes example 19 of the present disclosure, wherein example 19 also includes the subject matter according to example 18, above.

The detected portion of the x-ray beam comprises x-ray energy passed-through the inspection target. The preceding subject matter of this paragraph characterizes example 20 of the present disclosure, wherein example 20 also includes the subject matter according to any one of examples or 18-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 6 is a perspective view of a plurality of links of the flexible chain of FIG. 2 with a perpendicular aperture formed in a link, according to one or more embodiments of the present disclosure;

FIG. 7 is a perspective view of a plurality of links of the flexible chain of FIG. 2 with a perpendicular aperture formed by two adjacent links, according to one or more embodiments of the present disclosure;

FIG. 8 is a cross-sectional view of a link of the plurality of links of FIGS. 3 and 4, according to one or more embodiments of the present disclosure.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
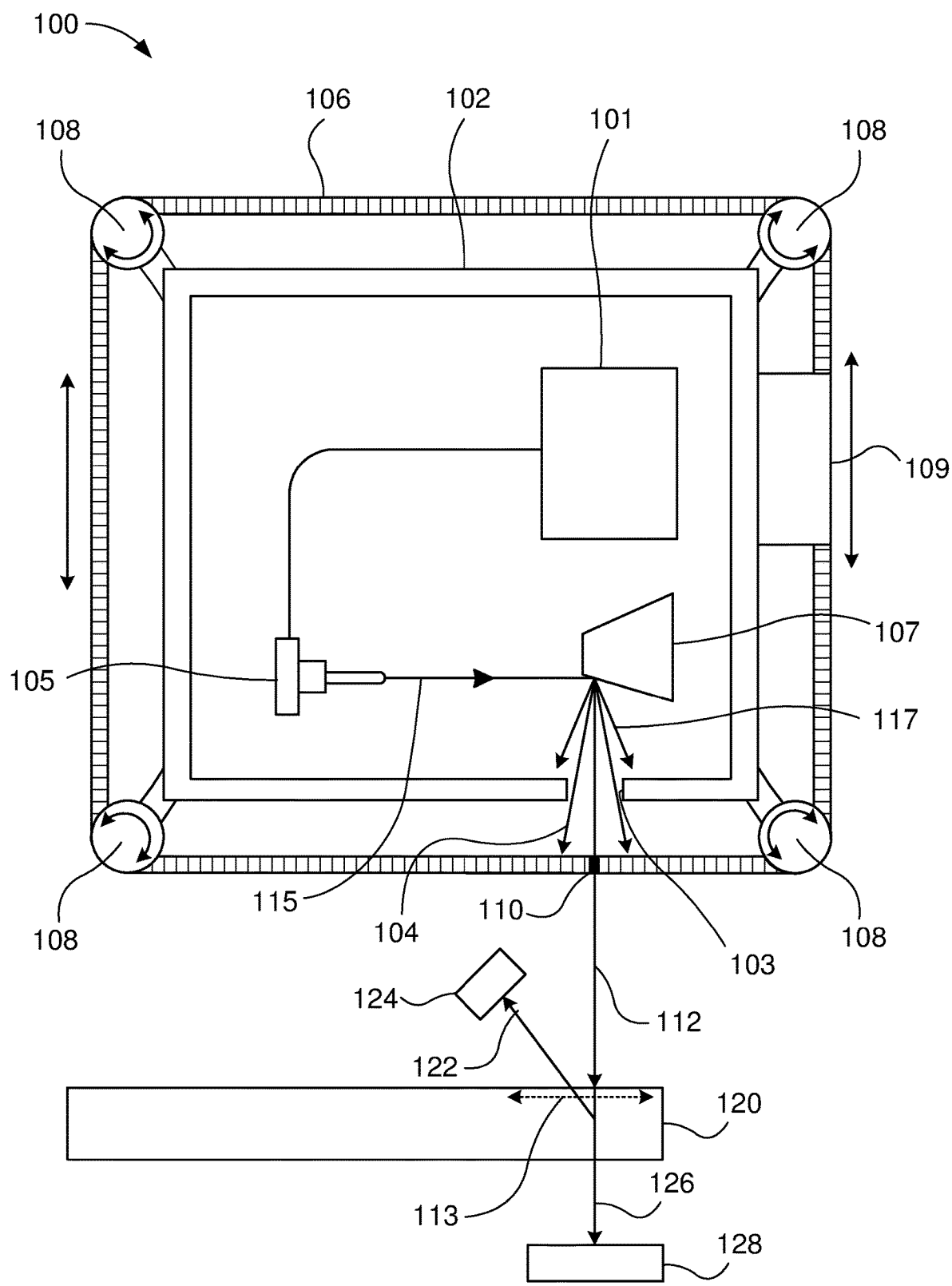
FIG. 1 is a cross-sectional view of a flexible chain apparatus for forming an x-ray beam with the apparatus positioned to wrap around an x-ray emitter, according to one or more embodiments of the present disclosure.

Referring to FIG. 1, a system 100 for x-ray backscattering inspection is shown. In the illustrated embodiment, the system 100 includes an x-ray emitter 102. The x-ray emitter 102 includes an x-ray emission port 103. The system 100 also includes a power supply 101, a cathode 105, and an anode 107. The cathode 105 and the anode 107 are connected to a power supply 101. The cathode 105 is selectively operable to generate an electron emission 115 that is received at the anode 107. The anode 107 receives the electron emission 115, from the cathode 105, and generates an initial x-ray 117. In the illustrated representation, the anode 107 of the system 100 is a rotating anode. However, in other representations, the anode 107 of the system 100 does not rotate. The anode 107 can be a tungsten anode coupled to a rotor or other feature to facilitate relative rotation between the anode 107 and the cathode 105.

The initial raw x-ray 117 is directed towards the emission port 103. The emission port 103 allows an x-ray emission 104 to be separated from the initial raw x-ray 117 and pass out of the x-ray emitter 102 while a separate portion of the initial raw x-ray 117 is blocked by the x-ray emitter 102. An apparatus, in the form of a flexible chain 106, is aligned with the x-ray emitter 102 to, at least partially, block the x-ray emission 104 from the x-ray emission port 103. The flexible chain 106 includes an aperture 110 formed in the flexible chain 106. The aperture 110 passes a portion of the x-ray emission 104 to form an x-ray beam 112.

In the illustrated embodiment, the x-ray emission port 103 is a slit formed in a side of the x-ray emitter 102 (e.g., a side of an enclosure of the x-ray emitter 102). As shown, the x-ray emission port 103 may be elongated in a lengthwise direction. The length of the x-ray emission port 103 may correspond to a length of a scanning path 113 along which the flexible chain 106 may direct the x-ray beam 112. The length of the x-ray emission port 103 may be adjustable to reduce or increase the projection angle of the available x-ray emission 104. The flexible chain 106 is aligned to receive the x-ray emission 104 and block the x-ray emission 104 except to form and pass the x-ray beam 112 from the x-ray emission 104 passing through the aperture 110.

The flexible chain 106 is aligned with the x-ray emission port 103 of the x-ray emitter 102 by a guide structure 108. The flexible chain 106 is sized and positioned to receive substantially all of the x-ray emission 104 passing through the x-ray emission port 103. The width of the flexible chain 106 may be dependent on the size of the x-ray emission port 103, an angle (or spread) of the x-ray emission 104 exiting the x-ray emission port 103, a distance the flexible chain 106 is away from the x-ray emission portion 103, and the like.

The flexible chain 106 may be advanced by a drive system 109 to change a relative position of the aperture 110 to raster the x-ray beam 112 along the scanning path 113. The flexible chain 106 may be advanced in a single direction or in multiple directions to move the x-ray beam 112 along the scanning path 113. In some embodiments, the movement of the flexible chain 106 is controlled based on a scanning command or in response to another scanning input received at the system 100.

In the illustrated embodiment, the scanning path 113 corresponds with an inspection target 120. As the x-ray beam 112 impinges on the inspection target 120, backscatter x-rays 122 are reflected by some portion (for example, the surface or some internal region) of the inspection target 120. The backscatter x-rays 122 are detected at a backscatter detector 124 to determine a quality or characteristic of the inspection target 120. Some portion of the x-ray beam 112 may also pass through the inspection target 120 to form pass-through x-rays 126. The pass-through x-rays 126 may be detected by a pass-through detector 128 to determine a characteristic of the inspection target 120. Backscatter inspection and pass-through inspection may be used together or exclusive of one another.

As shown in FIG. 1, the guide structures 108 for the flexible chain 106 may be positioned near corners or edges of the x-ray emitter 102. The guide structures 108 may include wheels, skids, rollers, or the like. The guide structure 108 may be adjustable or apply a force to the flexible chain 106 to provide tension to the flexible chain 106, to adjust the position of the flexible chain 106, or the like. The flexible chain 106 is held in alignment by the guide structures 108 and advanced by the drive system 109. The drive system 109 applies a driving force to the flexible chain 106 to advance the flexible chain 106 in one or both directions across the x-ray emission port 103. The drive system 109 may advance the flexible chain 106 at a particular rate based on a detection technique in which the x-ray emitter 102 is used or in response to a command or input provided to the system 100.

In the illustrated embodiment, the flexible chain 106 is positioned to encircle the x-ray emitter 102. In some embodiments, the flexible chain 106 forms a continuous loop having no ends. In other embodiments, the flexible chain 106 is a length of chain with a first end and a second end. The first end and second end may be managed by a chain management system such as one or more reels, containers, or the like. In some embodiments, the drive system 109 is incorporated into one or more components of the chain management system to advance the flexible chain 106.

While the x-ray emitter 102 is shown as having a rectangular geometry, the flexible chain 106 can accommodate x-ray emitters 102 in a range of sizes and geometries. Furthermore, the flexible chain 106 has a relatively small profile size and is light weight, which facilitate a reduced size and weight of the system 100 to improve portability and reduce cost of the system 100.

As shown, the flexible chain 106 may be disposed wholly external to the x-ray emitter 102. In some embodiments, at least a portion of the flexible chain 106 is disposed internal to the x-ray emitter 102. In some embodiments, one or more of the drive system 109 and the guide structures 108 may be disposed internal to the x-ray emitter 102.

The aperture 110 of the flexible chain 106 may form the x-ray beam 112 to have a particular cross-sectional geometry. The flexible chain 106 may include multiple apertures 110. The apertures 110 on the flexible chain 106 may be identical to one another. Alternatively, one or more of the apertures 110 on the flexible chain 106 may be different from the others of the apertures 110 in one or more of size, shape, orientation, or the like.

In some embodiments, multiple flexible chains 106 may be overlapped and synchronized to align multiple apertures 110 at the x-ray emission port 103 to produce the x-ray beam 112. The x-ray beam 112 may have a particular cross-sectional geometry based on the aligned apertures 110 of the multiple flexible chains 106.

Figure 2:
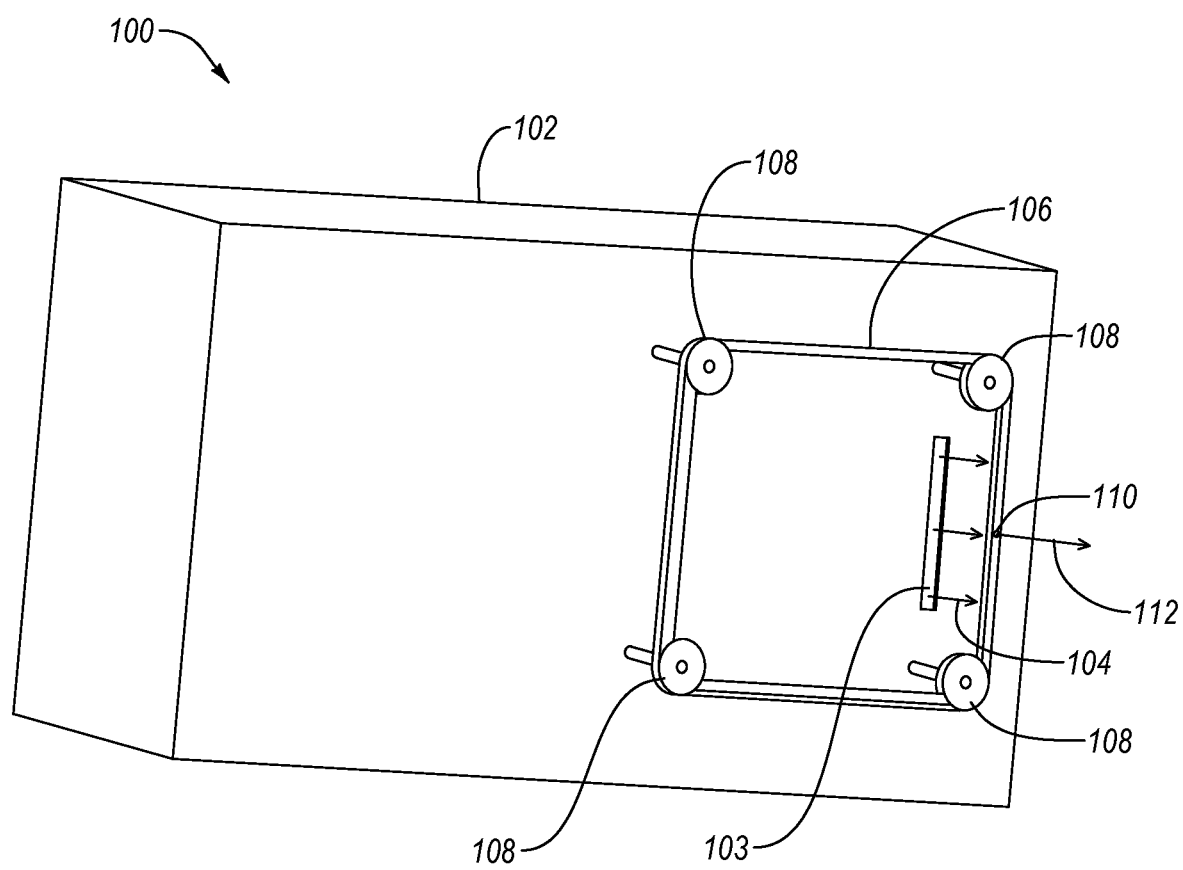
FIG. 2 is a perspective view of the system of FIG. 1 with the flexible chain positioned on a single side of the x-ray emitter, according to one or more embodiment of the present disclosure.

FIG. 2 is a perspective view of the system 100 of FIG. 1 with the flexible chain 106 disposed all on the same side of the x-ray emitter 102. In the illustrated embodiment, the flexible chain 106 forms a square path around the guide structures 108. In other embodiments, the flexible chain 106 wraps around fewer or more guide structures 108 to form paths with other geometries. For example, the flexible chain 106 may be fit to three guide structures forming a triangular path. In another example the flexible chain 106 may be fit on two guide structures 108 forming a back-and-forth path similar to a drive chain.

One or more of the guide structures 108 may be coupled to a drive system 109 to advance the flexible chain 106. Some or all of the guide structure 108 may be adjustable with respect to distance from one another and/or from the x-ray emitter 102. One or more of the guide structures 108 may be biased by a spring or other force applicator to apply a tensioning force on the flexible chain 106. This may compensate for chain stretch, thermal expansion, wear, different chain lengths, or the like. Additional functionality may be incorporated into one or more of the guide structures 108 such as chain cleaning, cooling, lubricating, vibration damping, and the like.

Figure 3:
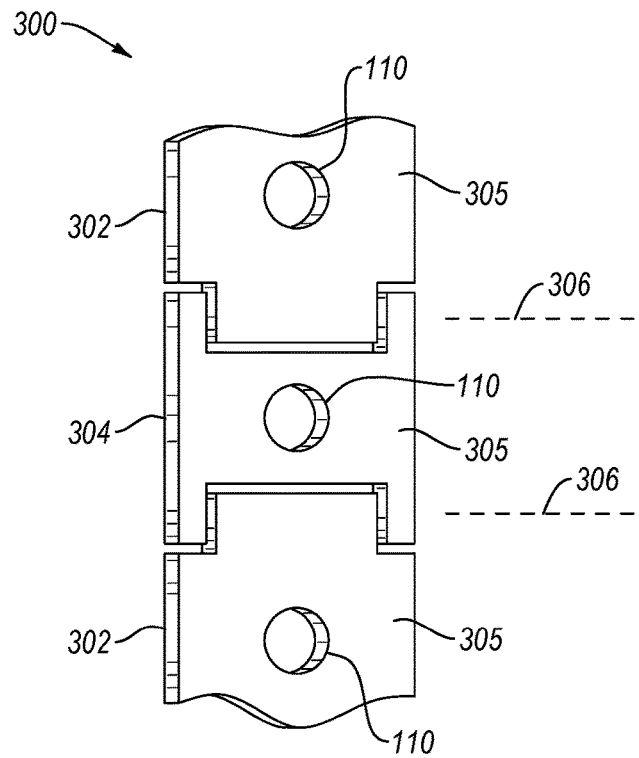
FIG. 3 is a perspective view of a plurality of dissimilar links of the flexible chain of FIG. 1 with apertures in each of the plurality of dissimilar links, according to one or more embodiments of the present disclosure.

FIG. 3 is a perspective view of a plurality of links 300 of the flexible chain 106 of FIG. 1. In the illustrated embodiment, the plurality of links 300 includes first links 302 and second links 304 being dissimilar from one another. While the illustrated embodiment includes two dissimilar link types, other embodiments may include more than two dissimilar link types.

Each of the first links 302 and the second links 304 are pivotably coupled to one another in an end-to-end manner. Each first link 302 is pivotably coupled to two second links 304; one second link 304 at one end of the first link 302 and another second link 304 at the other end of the first link 302. The first and second links are coupled together at pivot axes 306. Each of the first links 302 and the second links 304 has a single degree of freedom about the corresponding pivot axis 306. The pivot axis 306 may correspond with a pin or other coupling component which pivotably couples the links 302 and 304 to one another.

While each of the first links 302 and the second links 304 are shown as being separated by a gap, the separate is for purposes of clarity only. Embodiments of the flexible chain 106 form an unbroken barrier, with the exception of the apertures 110, with respect to the x-ray emission 104 which impinges on the flexible chain 106. The flexible chain 106 is shaped so as to form a continuous barrier at the joints between the links 302 and 304 such that relatively no x-ray emission 104 is allowed to pass between the link 302 and 304 except at formed apertures 110. The joints between the links 302 and 304 may be shielded by overlapping or other protruding portions. The joints may also include angles, bevels, curved regions, or the like to prevent or reduce any joint from presenting a gap or pass-through through which the x-ray emission 104 may pass.

Each of the first links 302 and the second links 304 includes an aperture 110 formed in a corresponding top face 305 of the first links 302 and the second links 304. The apertures 110 may be similar or dissimilar to one another. The apertures 110 may be formed in each link 302 and 304 as illustrated or may be separated by a number of links 302 and 304 having no apertures 110. The apertures 110 may be formed in the center of the corresponding link 302 and 304 or may be formed off-center. When formed in the top face 305 of the links 302 and 304, a central axis 111 of each aperture 110 is substantially perpendicular to the pivot axis 306.

Figure 4:
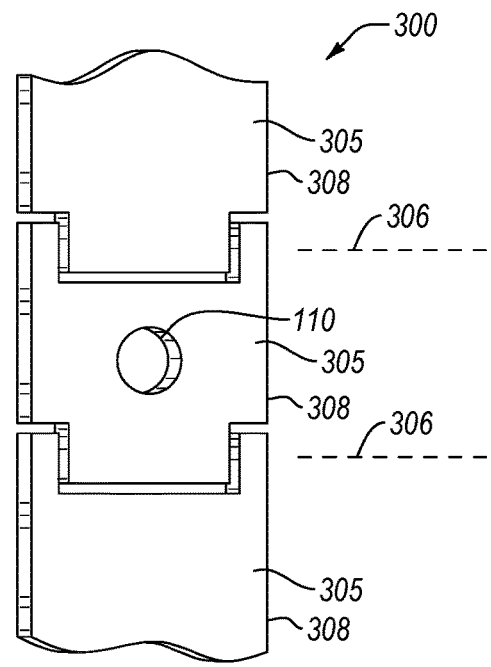
FIG. 4 is a perspective view of a plurality of similar links of the flexible chain of FIG. 1 with apertures formed in the plurality of similar links, according to one or more embodiments of the present disclosure.

With respect to FIG. 4, a plurality of links 300 is shown. The illustrated plurality of links 300 includes similar links 308. In this embodiment, each of the similar links 308 is similar in at least one of shape and size. The aperture 110 is formed in a front face 305 of the link 308. The aperture 110 is disposed in the center of the front face 305 but may be disposed off-center. In the illustrated embodiment, the aperture 110 is round. Alternatively, the aperture 110 may be oval, rectangular, or the like.

In some embodiments, the pivot axes 306 allow for full range of motion between corresponding links 308 in the plurality of links 300. The links 308 may also limit the range of movement about the pivot axes 306. For example, the links 308 may be configured to allow for relative pivoting of the links 308 in a direction opposite the front face 305 but may restrict relative pivoting of the links 308 in a direction towards the front face 305.

Figure 5:
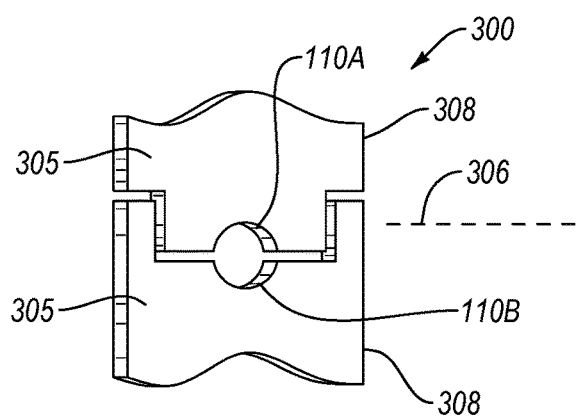
FIG. 5 is a perspective view of a plurality of links of the flexible chain of FIG. 1 with an aperture formed by two adjacent links, according to one or more embodiments of the present disclosure.

With regards to FIG. 5, the aperture 110 is formed jointly by a first contributing link 308A and a second contributing link 308B. The aperture 110 includes a first aperture portion 110A corresponding to the first contributing link 308A and a second aperture portion 110B corresponding to the second contributing link 308B. In the illustrated embodiment, the first aperture portion 110A is an identical mirror of the second aperture portion 110B. Alternatively, one of the first aperture portion 110A and the second aperture portion 110B may be different from the other. In other words, the first aperture portion 110A and the second aperture portion 110B may have a different size, shape, or position relative to the other.

In some embodiments, at least one of the first aperture portion 110A and the second aperture portion 110B of aperture 110 may coincide with the pivot axis 306 while, in other embodiments, at least one of the first aperture portion 110A and the second aperture portion 110B may be offset from the pivot axis 306. The first contributing link 308A may be similar to or different from the second contributing link 308B. Additionally, one or more of the first contributing link 308A and the second contributing link 308B may include a lip, curve, or other feature to provide complete shielding of the x-ray emission 104 from the x-ray emitter 102 to prevent x-rays, other than those passed by the aperture 110, from passing through the links 308A and 308B.

Referring to FIG. 6, the illustrated embodiment of the plurality of links 300 includes the aperture 110 formed on a side 312 of each link 310 of the plurality of links 300. The aperture 110 is aligned to have the central axis 111 of the aperture 110 parallel with the pivot axis 306. This positioning of the aperture 110 on the side 312 of the plurality of links 300 may facilitate the flexible chain arrangement shown in FIG. 2.

Referring now to FIG. 7, the aperture 110 is formed in the side 312 of the plurality of links 300. The aperture 110 is formed jointly by a first contributing link 310A and a second contributing link 310B. The aperture 110 extends through both the first contributing link 310A and the second contributing link 310B. The aperture 110 includes a first aperture portion 110A corresponding to the first contributing link 310A and a second aperture portion 110B corresponding to the second contributing link 310B. In the illustrated embodiment, the first aperture portion 110A is an identical mirror of the second aperture portion 110B. Alternatively, one of the first aperture portion 110A and the second aperture portion 110B may be different from the other. In other words, the first aperture portion 110A and the second aperture portion 110B may have a different size, shape, or position relative to the another. As with the embodiment shown in FIG. 6, the aperture 110 of FIG. 7 is jointly formed in the first contributing link 310A and the second contributing link 310B to have a central axis 111 of the aperture 110 parallel with the pivot axis 306.

FIG. 8 illustrates a cross-sectional view of a link 800 of the plurality of links 300 of FIGS. 3 and 4. The link 800 includes wear layers 802 and an x-ray shielding layer 804. Because wear may be more present on one side of the link 800, one of the wear layers 802 may be omitted or have a reduced thickness. As shown, the x-ray shielding layer 804. The wear layers 802 may improve a wear characteristic of link 800. Additionally, the wear layers 802 may improve the strength of the link 800. While the wear layers 802 are shown as layered onto the shielding layer 804, the wear layers 802 may also be extended to at least partially encapsulate or surround the shielding layer 804.

The x-ray shielding layer 804 may include lead or another material is sufficient thickness to shield or block x-rays from passing through the link 800 with the exception of x-rays passing through the aperture 110. In the illustrated embodiment, the x-ray shielding layer 804 and the wear layers 802 are planar. Each of the wear layers 802 and the x-ray shielding layer 804 may also be non-planar. The aperture 110 is an opening extending though the x-ray shielding layer 804 and the wear layers 802. The aperture 110 may also be formed in the x-ray shielding layer 804 alone.

The link 800 also includes pivot points 806. The pivot points 806 are shown at either end of the link 800. The pivot points 806 allow the link 800 to pivot with respect to another link (not shown). In the illustrated embodiment, the pivot points 806 are positioned within the x-ray shielding layer 804. Alternatively, the pivot points 806 may be positioned within one or both of the wear layers 802A and 802B.

The link 800 also includes interface structure 807. The interface structures 807 are disposed on a side of the link 800 at which a drive system 109 or guide structure 108 interfaces with the link 800. The interface structures 807 are shown as protruding outward from the link 800. However, the interface structures 807 may be recesses, ridges, teeth, grooves, texturing, or other surface features of the link 800 to facilitate interaction between the link 800 and at least one of the drive system 109 and the guide structure 108.

Figure 9:
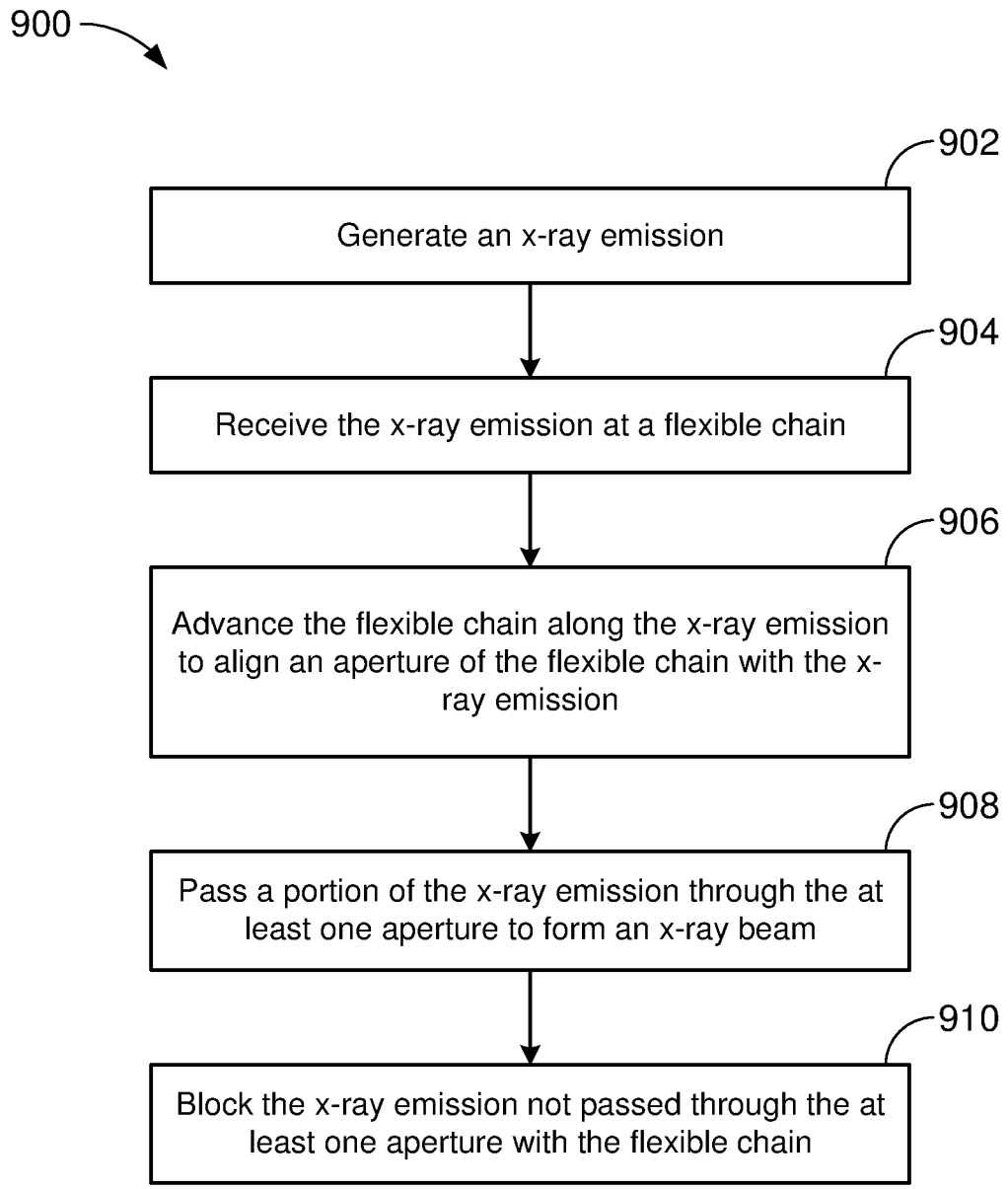
FIG. 9 is a flow diagram of a method of forming an x-ray bean for x-ray inspection, according to one or more embodiments of the present disclosure.

Referring to FIG. 9, a method 900 of forming an x-ray beam for x-ray inspection is shown. The method 900 includes generating an x-ray emission, at 902. Additionally, the method 900 includes receiving the x-ray emission at a flexible chain, at 904. The method 900 also includes advancing the flexible chain along the x-ray emission to align an aperture of the flexible chain with the x-ray emission, at 906. The method 900 further includes passing a portion of the x-ray emission through the at least one aperture to form an x-ray beam, at 908. Furthermore, the method 900 includes blocking the x-ray emission not passed through the at least one aperture with the flexible chain, at 910.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification.

For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for forming an x-ray beam, the apparatus comprising:
    an x-ray emitter comprising an x-ray emission port and configured to generate an x-ray emission that passes through the x-ray emission port; and
    a plurality of links pivotably coupled together, in an end-to-end manner, to form a continuous loop, wherein:
        a portion of each one of the plurality of links is configured to block a portion of the x-ray emission; and
        the plurality of links comprises a plurality of apertures; and
        each one of the plurality of apertures is configured to allow only a portion of the x-ray emission to pass through the aperture.

2. The apparatus according to claim 1, wherein an entirety of each one of the plurality of apertures is formed in a corresponding one of the plurality of links.

3. The apparatus according to claim 1, wherein at least one of the plurality of apertures is formed by two adjacent links of the plurality of links.

4. The apparatus according to claim 1, wherein the plurality of links are pivotably coupled together at corresponding pivot axes and each one of the plurality of apertures has a central axis that is perpendicular to the pivot axis.

5. The apparatus according to claim 1, wherein the plurality of links are pivotably coupled together at corresponding pivot axes and each one of the plurality of apertures has a central axis that is parallel to the pivot axis.

6. The apparatus according to claim 1, wherein at least one of the plurality of links comprises interface structures to facilitate interaction between the at least one of the plurality of links and a drive or support feature.

7. The apparatus according to claim 1, wherein at least one of the plurality of links comprises an x-ray shielding layer.

8. The apparatus according to claim 7, wherein at least one of the plurality of links comprises a wear layer.

9. The apparatus according to claim 1, wherein at least one of the plurality of apertures is separated from an adjacent one of the plurality of apertures by at least two links of the plurality of links.

10. A system for x-ray backscattering inspection, the system comprising:
    an x-ray emitter comprising an x-ray emission port and configured to generate an x-ray emission that passes through the x-ray emission port;
    a first flexible chain movably aligned with the x-ray emitter and comprising a plurality of links pivotably coupled together, in an end-to-end manner, to form a continuous loop, wherein the plurality of links comprises:
        two or more links configured to block the x-ray emission; and
        at least one link comprising an aperture that is configured to allow only a portion of the x-ray emission to pass through the aperture; and
    a drive system coupled to the x-ray emitter in engagement with the first flexible chain, wherein the drive system is operable to advance the aperture of the first flexible chain along the x-ray emission port.

11. The system according to claim 10, further comprising a second flexible chain wherein the second flexible chain aligns with the first flexible chain at the x-ray emission port to form a compound aperture.

12. The system according the claim 10, wherein the x-ray emission port is elongated in a lengthwise direction and wherein the drive system advances the first flexible chain along the x-ray emission port in the lengthwise direction.

13. A method of x-ray manipulation for x-ray inspection, the method comprising:
    generating an x-ray emission;
    receiving the x-ray emission at a flexible chain;
    advancing the flexible chain along the x-ray emission to align an aperture of the flexible chain with the x-ray emission;
    passing only a portion of the x-ray emission through the aperture to form an x-ray beam; and
    blocking the x-ray emission not passed through the aperture with the flexible chain;
    wherein advancing the flexible chain comprises driving the flexible chain with the flexible chain in a continuous loop.

14. The method according to claim 13, wherein advancing the flexible chain further comprises aligning the aperture with an x-ray emission port of an x-ray emitter.

15. The method according to claim 13, wherein advancing the flexible chain comprises advancing the aperture through the x-ray emission to raster the portion of the x-ray emission along a scanning path.

16. The method according to claim 13, wherein advancing the flexible chain comprises guiding the flexible chain with at least one guide structure.

17. The method according to claim 13, further comprising:
    directing the x-ray beam to an inspection target;
    detecting a portion of the x-ray beam affected by the inspection target; and
    determining a characteristic of the inspection target based on the detected portion of the x-ray beam.

18. The method according to claim 17, wherein the detected portion of the x-ray beam comprises x-ray energy backscattered by the inspection target.

19. The method according to claim 17, wherein the detected portion of the x-ray beam comprises x-ray energy passed-through the inspection target.

20. The apparatus according to claim 1, wherein each one of the plurality of links comprises a corresponding one of the plurality of apertures.

* * * * *